United States Patent
Baboulaz et al.

(10) Patent No.: US 9,591,168 B2
(45) Date of Patent: Mar. 7, 2017

(54) APPARATUS FOR IMAGING A PAGE OF A BOOK OR OTHER SIMILAR DOCUMENT

(71) Applicant: Ecole Polytechnique Federale de Lausanne (EPFL), Lausanne (CH)

(72) Inventors: Loic Arnaud Baboulaz, Lausanne (CH); Martin Vetterli, Grandvaux (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 14/802,536

(22) Filed: Jul. 17, 2015

(65) Prior Publication Data

US 2017/0019554 A1    Jan. 19, 2017

(51) Int. Cl.
*H04N 1/04* (2006.01)
*H04N 1/12* (2006.01)
(Continued)

(52) U.S. Cl.
CPC ....... *H04N 1/1295* (2013.01); *H04N 1/02845* (2013.01); *H04N 1/19594* (2013.01); *H04N 2201/0081* (2013.01)

(58) Field of Classification Search
CPC ............. H04N 1/1295; H04N 1/19594; H04N 1/02845
(Continued)

(56) References Cited

U.S. PATENT DOCUMENTS 7,595,915 B2 *   9/2009   Belkhir .................. B42D 9/065
                                                            358/400

* cited by examiner

Primary Examiner — Houshang Safaipour
(74) Attorney, Agent, or Firm — Taft Stettinius & Hollister LLP

(57) ABSTRACT

The present invention relates to an apparatus for imaging a page of a book or other similar document comprising:
 a table defining a support plane, the book being disposed on the table such that the page to image is substantially parallel to the support plane and an other page of the book is orientated at an angle α relative to the support plane, α being between 0° and 70°;
 means for displacing the table parallel to the support plane along a longitudinal direction and a lateral direction and/or perpendicular to the support plane along a normal direction;
 a plurality of light sources, each light source producing an incident light and directing said incident light onto an inspection area of the page to image at a predetermined zenith angle $\theta_i$ and at a predetermined azimuth angle $\phi_i$;
 means for sensing the light reflected by the page to image;
 at least one control unit adapted to control said displacing means, said light sources and said sensing means;
wherein the light sources are fixedly connected to a main frame, said main frame defining a partially or fully hemispherical dome;
wherein said main frame comprises a first module and a second module, said second module being detachably connected to the first module at a first end thereof, said first end defining a plane that is obliquely orientated at an angle β relative to the support plane; and
wherein, when the second module is disconnected from the first module, a free space between the first end of the first module and the support plane is adapted to permit the movement of the table and the book in the longitudinal and lateral directions without coming into contact with the main frame.

21 Claims, 7 Drawing Sheets

(51) Int. Cl.
*H04N 1/195* (2006.01)
*H04N 1/028* (2006.01)

(58) Field of Classification Search
USPC .................................. 358/479, 474, 498, 497
See application file for complete search history.

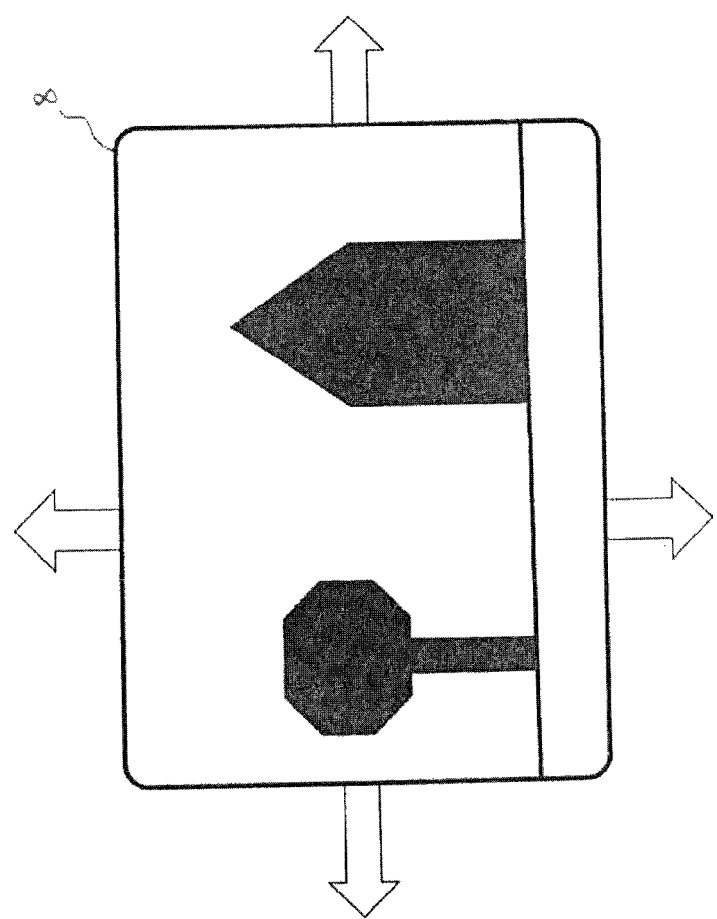
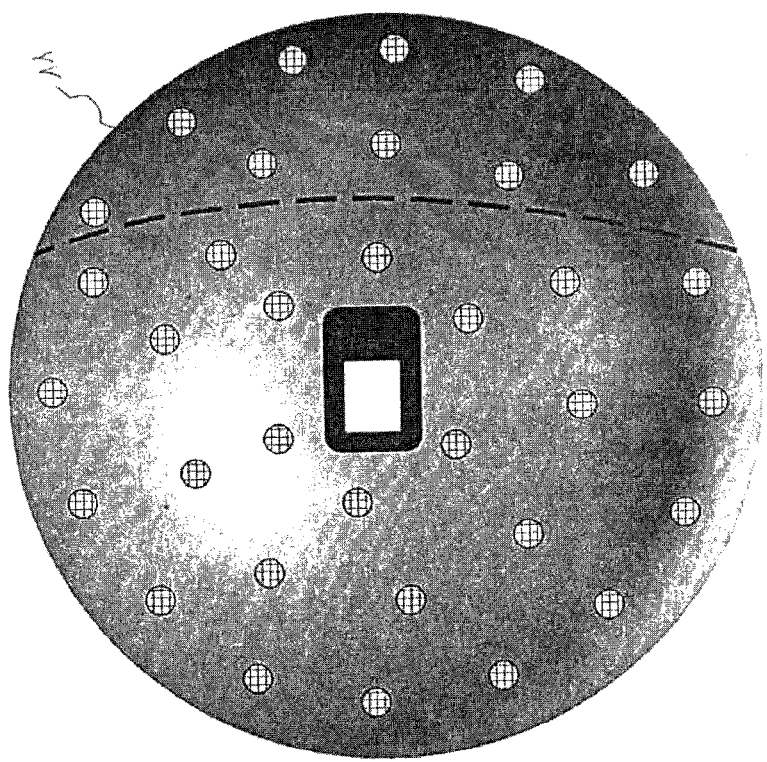
FIG. 3

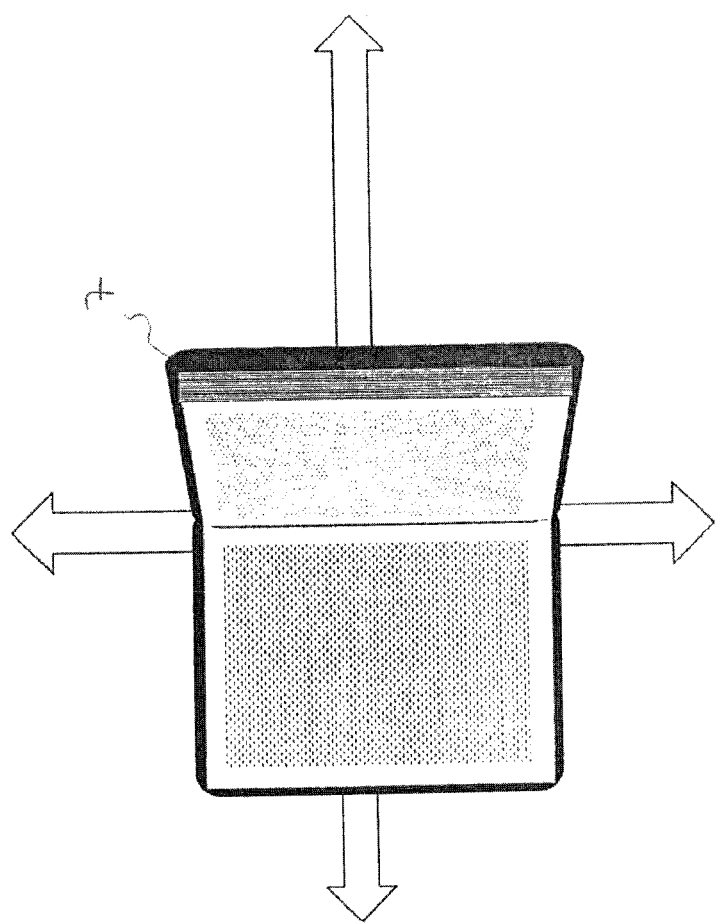
FIG. 5
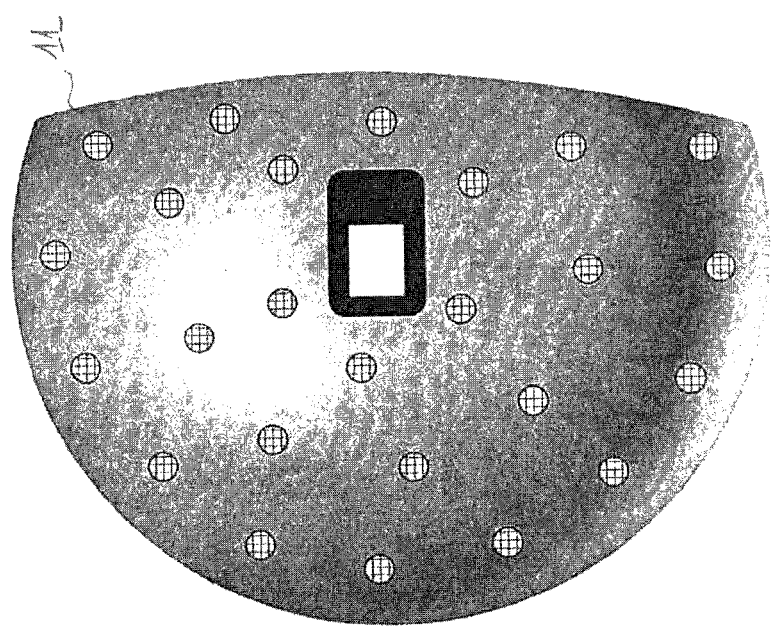

APPARATUS FOR IMAGING A PAGE OF A BOOK OR OTHER SIMILAR DOCUMENT

FIELD OF THE INVENTION

The present invention relates to an apparatus for imaging a page of a book or other similar document.

BACKGROUND OF THE INVENTION

There is a growing trend for libraries, universities and other institutions to archive digital images of rare and fragile books in the event that damage or deterioration occurs to the original, or in view of making available their content to a large public, on a specific web-site for instance.

One conventional method for imaging a page of a book consists in taking a picture of the page with a scanner. In this method, the book is lying flat inside the scanner to avoid distortion of the captured images. The major problem with this imaging method is the difficulty to open the book to 180°, due to the binding. Thus, this method may lead to irreversible damages to books which have fragile bindings, and for books which can not be fully opened, if one attempts to wide open the book. Therefore, this method is inappropriate for old books which are generally opened to 120° or less to minimize stresses on the book binding. Another problem of this method is the risk of a deterioration of the pages of the book due to the contact between said pages and the transparent plate of the scanner.

One known solution to these problems is the use of specific optical devices permitting the imaging of partially open books. in particular, EP 0 655 855 A2 relates to such an optical device. In this prior art, the solution consists to employ a wedge scanner comprising 2-dimensional array detectors attached at a common edge and disposed in a wedge shaped manner. Thus configured, the wedge scanner can record the content of a partially open book. However, this solution can not prevent that damage or deterioration occurs to the book when the wedge scanner comes into contact with the pages.

Finally, the previous methods are limited to single picture of a page, which allows only a 2-dimensional analysis of the content of the page. Considering that pages of books also contain a lot of additional information in various features such as the diverse materials used (e.g. ink, gold), imprints of printing making process, various defects, and undulations of the paper, such methods do not permit a complete analysis of a page of a book from a single digital picture, which is a growing demand of libraries.

A need therefore exists to develop an apparatus for imaging a page of a book or other similar document that overcomes the deficiencies of the above mentioned apparatus.

SUMMARY OF THE INVENTION

In this view, the present invention relates to an apparatus for imaging a page of a book or other similar document comprising:
- a table defining a support plane, the book being disposed on the table such that the page to image is substantially parallel to the support plane and an other page of the book is orientated at an angle $a$ relative to the support plane, $\alpha$ being between 0° and 70°;
- means for displacing the table parallel to the support plane along a longitudinal direction and a lateral direction and/or perpendicular to the support plane along a normal direction;
- a plurality of light sources, each light source producing an incident light and directing said incident light onto an inspection area of the page to image at a predetermined zenith angle $\theta_i$ and at a predetermined azimuth angle $\phi_i$;
- means for sensing the light reflected by the page to image;
- at least one control unit adapted to control said displacing means, said light sources and said sensing means;

wherein the light sources are fixedly connected to a main frame, said main frame defining a partially or fully hemispherical dome;

wherein said main frame comprises a first module and a second module, said second module being detachably connected to the first module at a first end thereof, said first end defining a plane that is obliquely orientated at an angle $\beta$ relative to the support plane; and wherein, when the second module is disconnected from the first module, a free space between the first end of the first module and the support plane is adapted to permit the movement of the table and the book in the longitudinal and lateral directions without coming into contact with the main frame.

Important features of the apparatus are defined in dependent claims 2 to 10.

Thus configured, the apparatus of the present invention permits to capture images of a page of a book under various illumination conditions, even if this book is partially open. Furthermore, the sensing means being disposed distant from the book, there is no risk of deterioration of the pages of the book during the imaging process.

Also, the apparatus allows high-resolution analysis of the page of a book by displacing the inspection area with the table until all the surface of the document has been covered.

Finally, thanks to the plurality of lights, the apparatus of the present invention permits to capture a 3-dimensional view and the reflectance properties of the different materials of the pages of the book, thus greatly improving the volume of information and providing high quality digital rendering of the book on computers or other digital devices.

BRIEF DESCRIPTION OF THE DRAWINGS

Other features and advantages of the present invention will appear more clearly from the detailed description of two embodiments of the invention which are presented solely by way of non-restricted examples and illustrated by the attached drawings in which:

FIG. 3 is bottom view of the apparatus illustrated in FIG. 1 in a specific arrangement for imaging a painting;

FIG. 5 is bottom view of the apparatus illustrated in FIG. 1 in a specific arrangement for imaging a partially open book;

DETAILED DESCRIPTION OF EMBODIMENTS OF THE INVENTION

Figure 1:
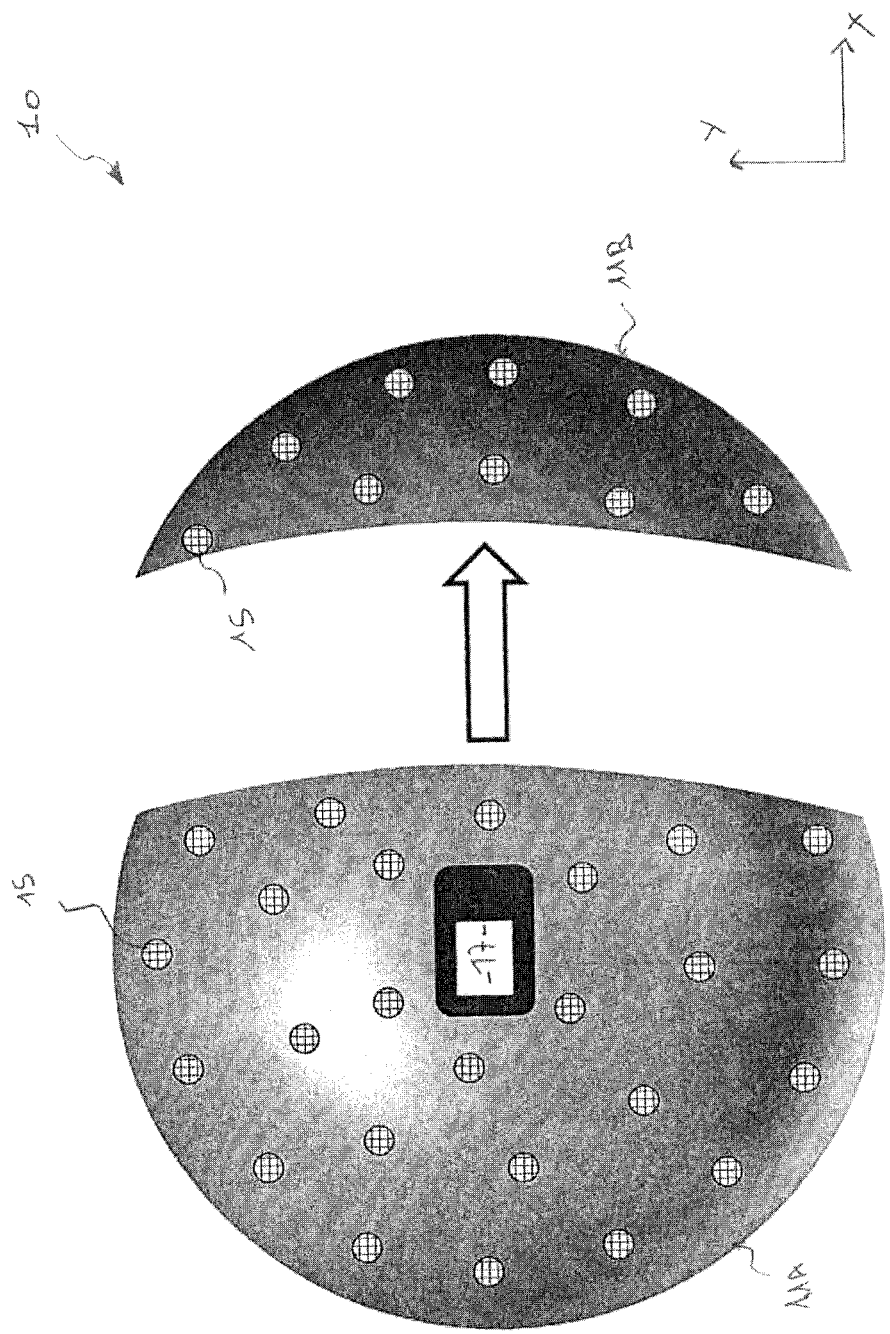
FIG. 1 is a bottom view of an apparatus according to an embodiment of the present invention.
Figure 2:
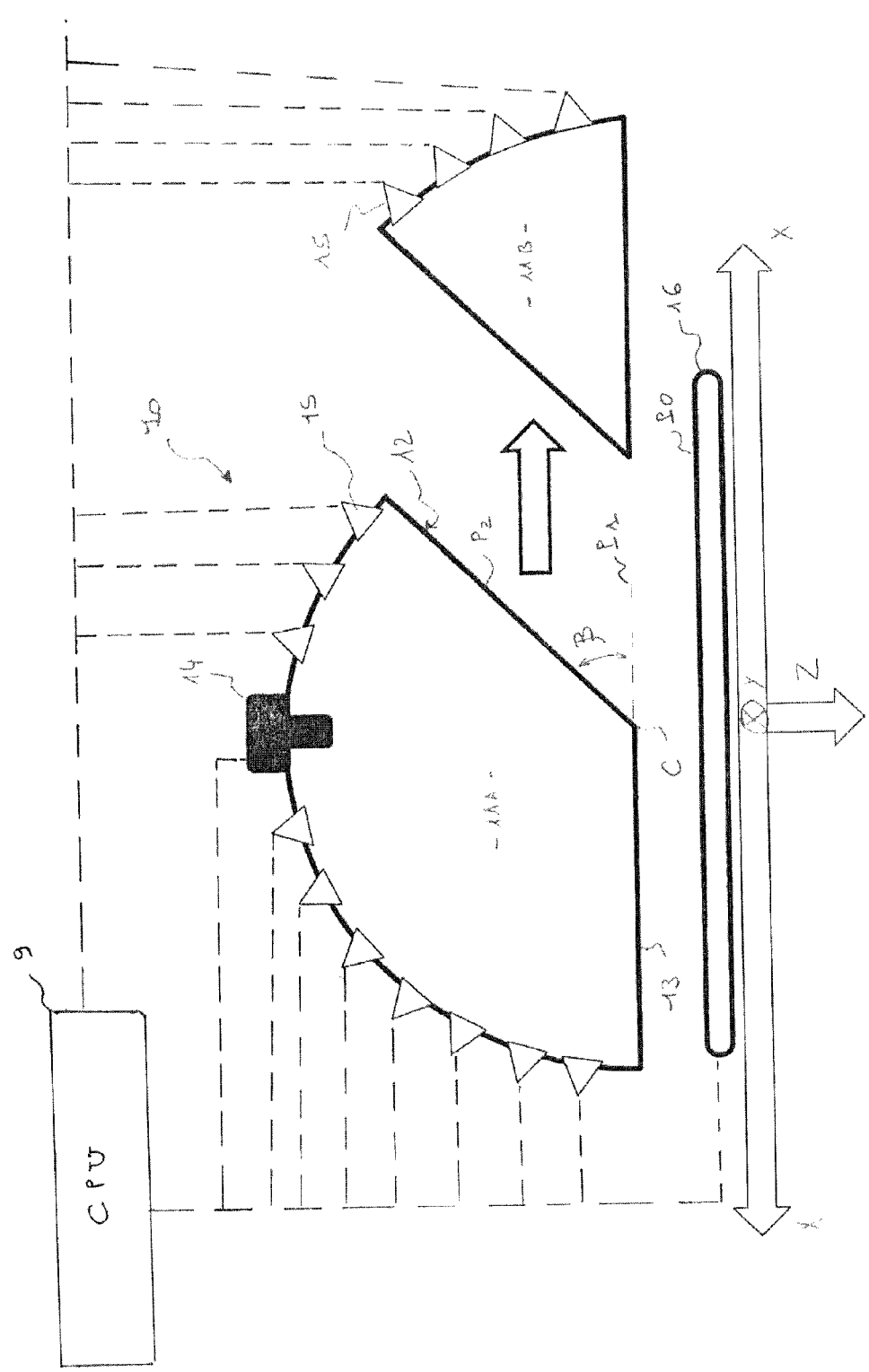
FIG. 2 is a schematic side view of the apparatus illustrated in FIG. 1.
Figure 7:
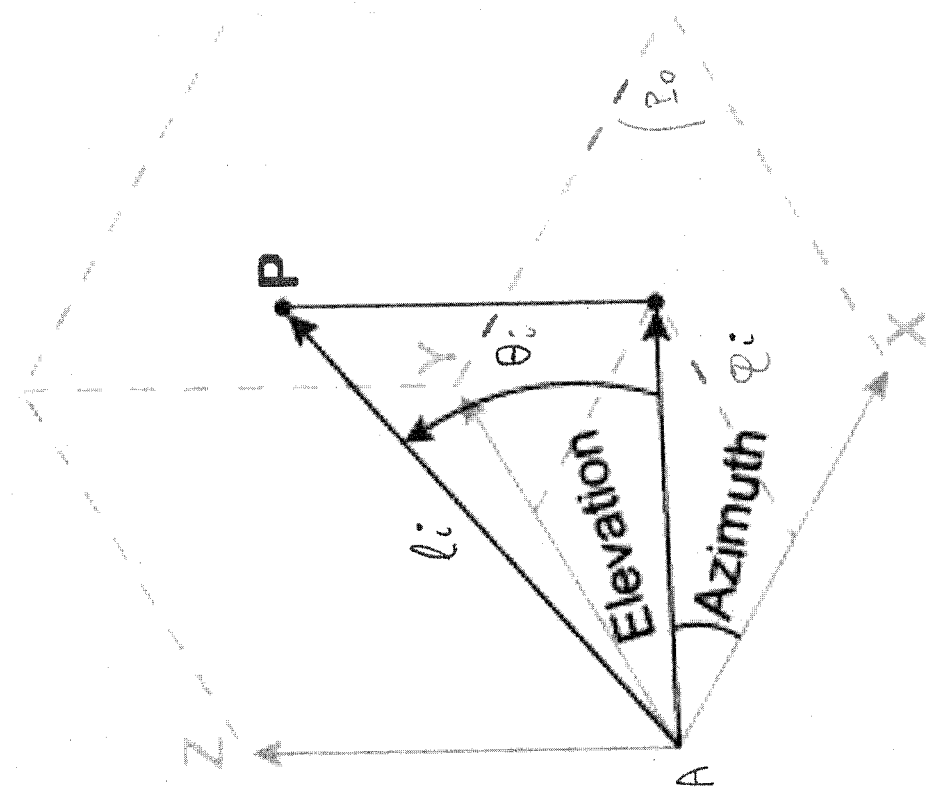
FIG. 7 is a schematic representation of an incident light coming from a light source of the apparatus illustrated in FIG. 1.

FIGS. 1 and 2 illustrate an apparatus according to the present invention that may be utilized to capture images of a planar document, like a page of a book, or a painting. In this exemplary embodiment, the apparatus 10 comprises a main frame defining a hemispherical dome, said main frame comprising a first module 11A and a second module 11B detachably connected together along a first end 12 of the first module 11A. As illustrated in FIG. 2, the first end 12 defines a plane P2 which is orientated at an angle β with respect to a plane P1 defined by a second end 13 of the first module 11A. The intersection between planes P1 and P2 may advantageously be positioned to go through the center C of the dome so as to permit to a sensing element mounted at the apex of the main frame to capture a light reflected by an inspection area of the document to image, when this area is in close proximity to the center C. The sensing element may advantageously be a camera 14 mounted inside a hole 17 of the first module 11A so as to receive light from the interior of the main frame. The main frame is positioned above a table 16, which is adapted to support the document to image. The table 16 is defined by a support plane P0 which may advantageously be parallel to the plane P1. The table 16 is advantageously movable along a longitudinal direction X and a lateral direction Y parallel to the support plane P0 and, preferably, along a normal direction Z which is perpendicular to the support plane P0. The displacement of the table may be done by any conventional displacing means and be controlled by a control unit 9 in operative communication with said displacing means. Thus, the document to image can be moved during the imaging process so as to successively position each inspection area thereof directly below the camera 14 till its full surface is imaged. Each one of the light sources 15 is slightly angled as to focus the beam exactly on the inspection area, which is a little further the center C of the dome. To capture a 3-dimensional image of the document, the camera 14 measures the light reflected by each inspection area of the document for each of a set of predetermined positions of a light source 15 on the periphery of the dome formed by the main frame. As illustrated in FIG. 7, each predetermined position P of the light source 15 produces a different incident light li onto the inspection area A, said incident light being defined by a predetermined zenith angle θi and a predetermined azimuth angle φi. Thus, the apparatus 10 comprises a plurality of light sources 15 which are fixedly connected to the main frame, said light sources defining a set of predetermined positions P. Said light sources may advantageously be light emitting diodes.

In further embodiments of the present invention, the sensing element may also consist in a video camera and/or may be orientated obliquely relative to the normal direction Z. The apparatus may also comprise a plurality of sensing elements, the sensing elements being disposed around the periphery of the dome formed by the main frame, each sensing element being preferably disposed between two adjacent light sources.

The control of the light sources 15 and of the camera 14 may be done by the control unit 9 which is in operative communication therewith.

The numeric data registered by the camera 14 are treated downward by a data processing unit, preferably a computer, in operative communication therewith so as to permit the calculation of the reflectance properties of the document to image. One conventional method consists to characterize the reflectance properties of a surface by its bidirectional reflectance distribution function (BRDF), as explained in the document "Geometric Considerations and Nomenclature for Reflectance", U.S. Department of Commerce, National Bureau of Standards, published in October 1977 and written by Nicodemus, F. E., Richmond, J. C., and Hsia, J. J. This method thus permits to define a surface by parametric texture maps, which can be shown as 3-dimensional images in a computer graphics system.

Figure 4:
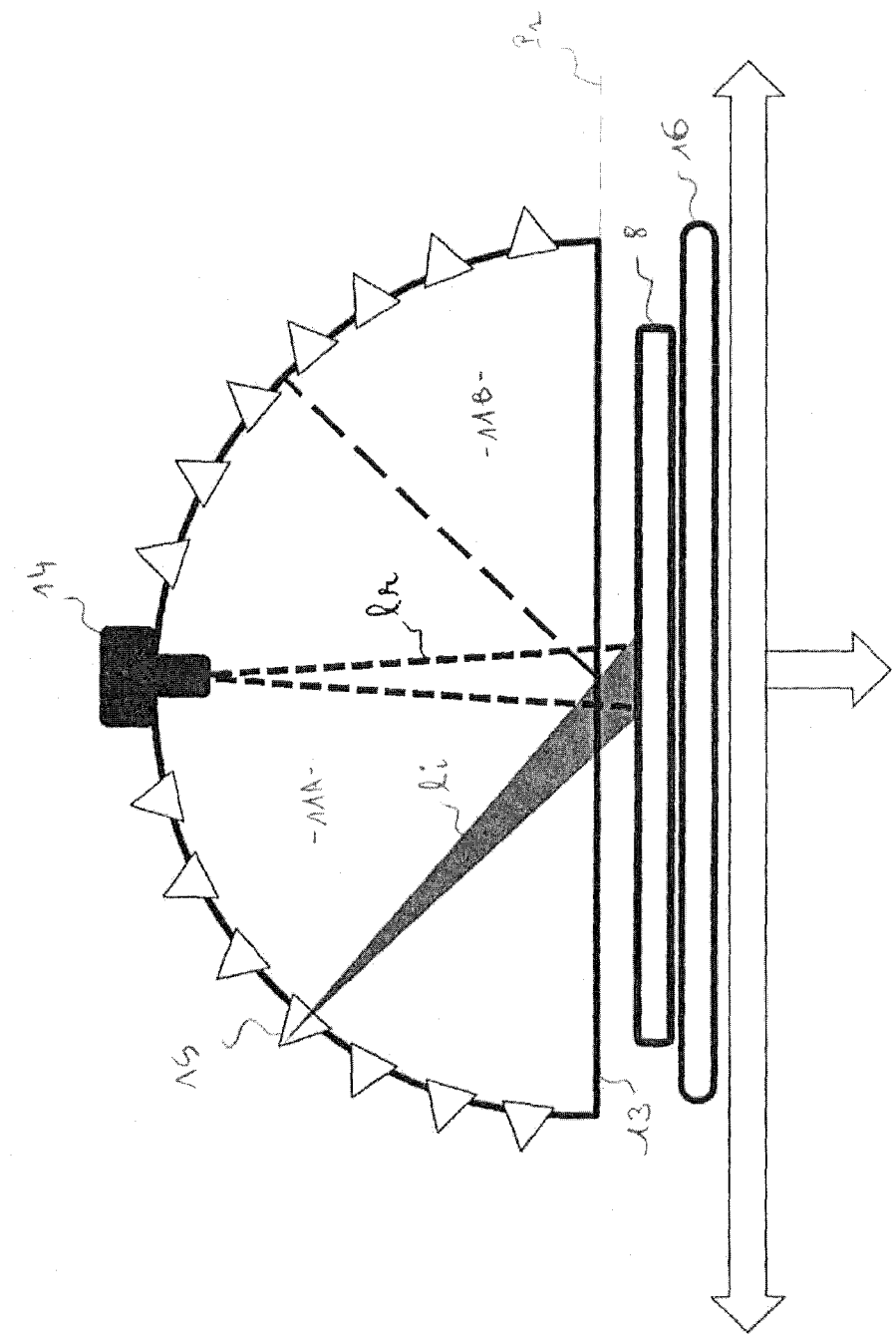
FIG. 4 is a schematic side view of the apparatus illustrated in FIG. 3 during the analysis of the painting.

In the embodiment shown in FIGS. 3 and 4, the document to image is a painting 8. The second module 11B being connected to the first module 11A, the main frame 11 defines a fully hemispherical dome. By displacing the table 16, the painting 8 supported by said table is progressively moved under the camera 14 such that its full upper surface can receive an incident light li from the light sources 15 and emit a reflected light lr toward the camera 14. The light lr is then captured by the camera 14 and analyzed by the data processing unit in operative communication therewith to calculate the BRDF of the painting. In this exemplary embodiment, no contact may occur between the painting 8 and the main frame 11 due to the fact that the painting is substantially flat and is positioned under the plane P1 defined by the bottom end 13 of the main frame 11.

Figure 6:
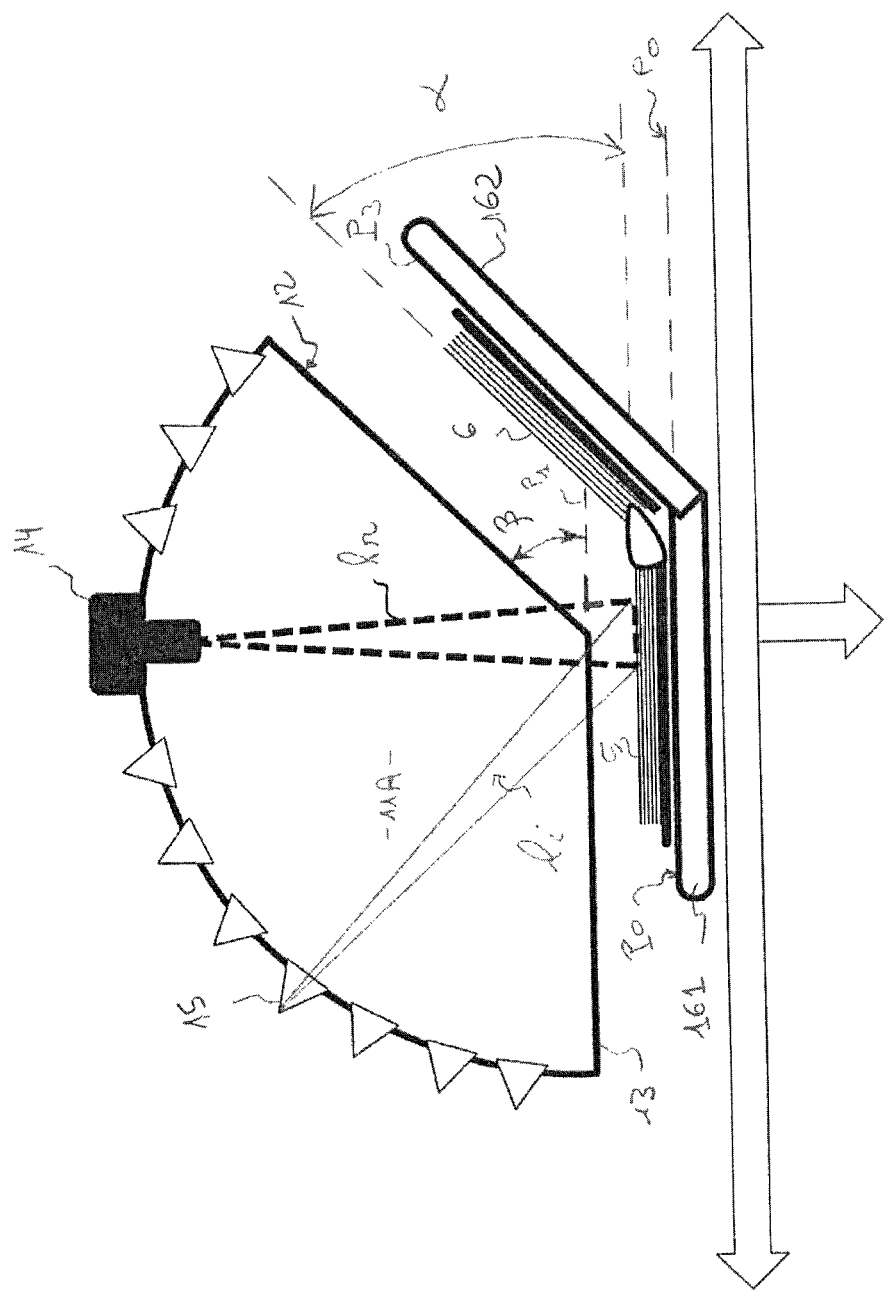
FIG. 6 is a schematic side view of the apparatus illustrated in FIG. 5 during the analysis of the partially open book.

In the embodiment shown in FIGS. 5 and 6, the document to image is a partially open book 7. The second module 11B being disconnected to the first module 11A, the main frame 11 defines a partially hemispherical dome. The table 16 comprises a first panel 161 and a second panel 162 connected thereto, the upper face of the first panel 161 defining the support plane P0 and the upper face of the second panel 162 defining a plane P3 which is orientated at an angle α relative to the support plane P0. The book 7 is disposed on the table 16 so that its binding is substantially straight above the intersection between said plane P0 and said plane P3. Thus, the pages 5 of the book 7, which are positioned in the left part of the book 7 relative to the binding, are parallel to the support plane P0 and the pages 6 of the book 7, which are positioned in the right part of the book 7 relative to the binding, are parallel to the plane P3. The angle α may advantageously be easily adapted so as to be equal to an angle αmin corresponding to the widest opening position of the book. For old books, this angle αmin is generally equal to 70°. Furthermore, the angle β between the first and second ends 12, 13 of the first module 11A may advantageously be equal to the angle α.

As illustrated in FIG. 6, when the first panel 161 of the table is relatively close to the second end 13 of the first module 11A, the second panel 162 extends above the plane P1 defined by said second end 13. Therefore, it is highly probable that this second panel 162 would have come into contact with the second module 11B, if the main frame 11 had kept its full hemispherical shape of FIG. 3. The present embodiment provides a solution to this problem by clearing the way between the first end 12 of the first module 11A and the support plane P0, which permits to displace the table 16, and thus the book 7, without any contact between said table and the main frame. By displacing the table 16, the book 7 supported by said table is progressively moved under the camera 14 such that the full surface of the page 5 can receive an incident light li from the light sources 15 and emit a reflected light lr toward the camera 14. The light lr is then captured by the camera 14 and analyzed by the data processing unit in operative communication therewith to calculate the BRDF of the page 5. This imaging process can be repeated for each page of the book till its full content is recorded as numeric data in the data processing unit.

The above detailed description with reference to the drawings illustrates rather than limits the invention. There are numerous alternatives, which fall within the scope of the appended claims.

The invention claimed is:

1. An apparatus for imaging a page of a book or other similar document comprising:
   a table defining a support plane, the book being disposed on the table such that the page to image is substantially parallel to the support plane and an other page of the book is orientated at an angle α relative to the support plane, α being between 0° and 70°,
   the table being displaceable parallel to the support plane along a longitudinal direction and a lateral direction and/or perpendicular to the support plane along a normal direction;
   a plurality of light sources, each light source producing an incident light and directing said incident light onto an inspection area of the page to image at a predetermined zenith angle $\theta_i$ and at a predetermined azimuth angle $\phi_i$;
   at least one sensor configured to sense the light reflected by the page to image;
   at least one controller adapted to control displacement of the table, said light sources and said at least one sensor;
   wherein the light sources are fixedly connected to a main frame, said main frame defining a partially or fully hemispherical dome;
   wherein said main frame comprises a first part and a second part, said second part being detachably connected to the first part at a first end thereof, said first end defining a plane that is obliquely orientated at an angle β relative to the support plane; and
   wherein, when the second part is disconnected from the first part, a free space between the first end of the first part and the support plane is adapted to permit the movement of the table and the book in the longitudinal and lateral directions without coming into contact with the main frame.

2. An apparatus according to claim 1, wherein the angle β is substantially equal to the angle α.

3. An apparatus according the claim 2, wherein the angle β is substantially equal to 70°.

4. An apparatus according to claim 1, wherein the at least one sensor includes at least one camera fixedly connected to the main frame.

5. An apparatus according to claim 4, wherein said camera is positioned at the apex of the hemispherical dome.

6. An apparatus according to claim 4, wherein the at least one sensor includes a plurality of cameras, the cameras being disposed around the periphery of the hemispherical dome, each camera being positioned between two adjacent light sources.

7. An apparatus according to claim 1, wherein each light source is a light emitting diode.

8. An apparatus according to claim 1, wherein the table comprises first and second panels connected together, the first panel defining the support plane and the second panel being orientated at the angle α relative to the support plane.

9. An apparatus according to claim 1, further comprising a data processing unit in operative communication with the at least one sensor so as to calculate a bidirectional reflectance distribution function of the page based on numeric data registered by the at least one sensor.

10. An apparatus according to claim 9, wherein the data processing unit is a computer.

11. An apparatus for imaging a page of a book or other similar document comprising:
    a table defining a support plane, the book being disposed on the table such that the page to image is substantially parallel to the support plane and an other page of the book is orientated at an angle a relative to the support plane, α being between 0° and 70°,
    a plurality of light sources, each light source producing an incident light and directing said incident light onto an inspection area of the page to image at a predetermined zenith angle $\theta_i$, and at a predetermined azimuth angle $\phi_i$;
    at least one sensor configured to sense the light reflected by the page to image;
    at least one controller adapted to control said light sources and said at least one sensor;
    wherein the light sources are fixedly connected to a main frame, said main frame defining a partially or fully hemispherical dome;
    wherein said main frame comprises a first part and a second part, said second part being detachably connected to the first part at a first end thereof, said first end defining a plane that is obliquely orientated at an angle β relative to the support plane; and
    wherein, when the second part is disconnected from the first part, a free space between the first end of the first part and the support plane is adapted to permit relative movement between the main frame and the table and the book in longitudinal and lateral directions along the support plane without the table and the book coming into contact with the main frame.

12. An apparatus according to claim 11, wherein the at least one controller is adapted to control the relative movement between the main frame and the table and the book.

13. An apparatus according to claim 11, wherein the angle β is substantially equal to the angle α.

14. An apparatus according to claim 13, wherein the angle β is substantially equal to 70°.

15. An apparatus according to claim 11, wherein the at least one sensor includes at least one camera fixedly connected to the main frame.

16. An apparatus according to claim 15, wherein said camera is positioned at the apex of the hemispherical dome.

17. An apparatus according to claim 15, wherein the at least one sensor includes a plurality of cameras, the cameras being disposed around the periphery of the hemispherical dome, each camera being positioned between two adjacent light sources.

18. An apparatus according to claim 11, wherein each light source is a light emitting diode.

19. An apparatus according to claim 11, wherein the table comprises first and second panels connected together, the first panel defining the support plane and the second panel being orientated at the angle α relative to the support plane.

20. An apparatus according to claim 11, further comprising a data processing unit in operative communication with the at least one sensor so as to calculate a bidirectional reflectance distribution function of the page based on numeric data registered by the at least one sensor.

21. An apparatus according to claim 20, wherein the data processing unit is a computer.

* * * * *